United States Patent [19]

Seidner

[11] Patent Number: 5,002,382
[45] Date of Patent: Mar. 26, 1991

[54] MULTIFOCAL CORNEAL CONTACT LENSES

[76] Inventor: Leonard Seidner, 228 St. John's Pl., Brooklyn, N.Y. 11217

[21] Appl. No.: 447,186

[22] Filed: Dec. 7, 1989

[51] Int. Cl.⁵ .............................................. G02C 7/04
[52] U.S. Cl. .................................................... 351/161
[58] Field of Search ............... 351/160 R, 160 H, 161, 351/162

[56] References Cited

U.S. PATENT DOCUMENTS

| | | | |
|---|---|---|---|
| 3,415,597 | 12/1968 | Harman | 351/160 H |
| 3,597,055 | 8/1971 | Neefe | 351/161 |
| 3,984,506 | 10/1976 | Tsuetaki | 264/1 |
| 4,162,122 | 7/1979 | Cohen | 351/161 |
| 4,302,081 | 11/1981 | Tsuetaki | 351/161 |
| 4,477,158 | 10/1984 | Pollock et al. | 351/161 X |
| 4,573,775 | 3/1986 | Bayshore | 351/161 |
| 4,605,524 | 8/1986 | Danker | 264/2.5 |
| 4,614,413 | 9/1986 | Obssuth | 351/161 |
| 4,618,228 | 10/1986 | Baron et al. | 351/161 |
| 4,636,049 | 1/1987 | Blaker | 351/161 |
| 4,637,697 | 1/1987 | Freeman | 351/161 |
| 4,693,572 | 9/1987 | Tsuetaki et al. | 351/161 |
| 4,704,016 | 11/1987 | de Carle | 351/161 |
| 4,752,123 | 6/1988 | Blaker | 351/161 |

FOREIGN PATENT DOCUMENTS

| | | | |
|---|---|---|---|
| 201231 | 11/1986 | European Pat. Off. | 351/161 |
| 3222099 | 12/1983 | Fed. Rep. of Germany | 351/161 |

*Primary Examiner*—Scott J. Sugarman
*Attorney, Agent, or Firm*—Henry D. Coleman; R. Neil Sudol

[57] ABSTRACT

In multifocal corneal contact lenses, the lenses of each pair have a different geometric configuration and/or distribution of focal zones. The zones are distributed to provide vision corrections of different kinds for the two eyes of a patient under different illumination conditions.

28 Claims, 12 Drawing Sheets

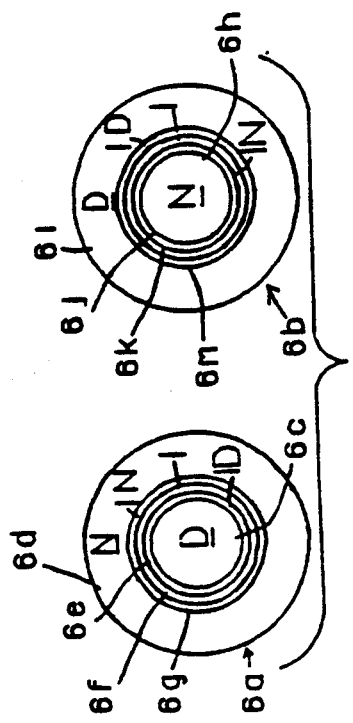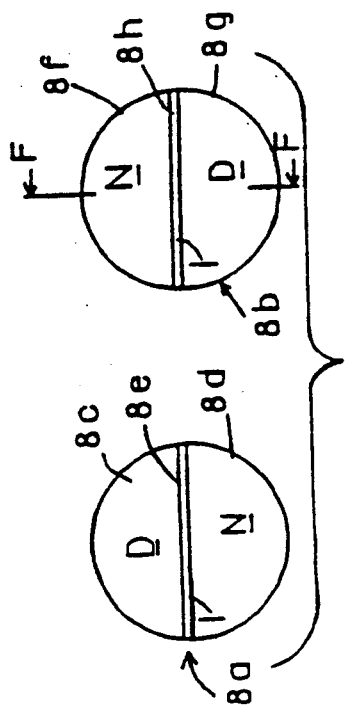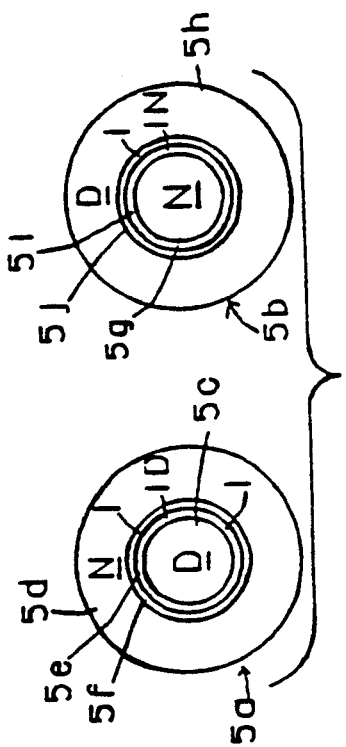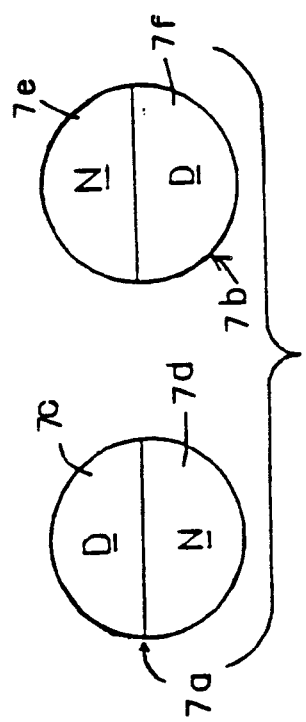

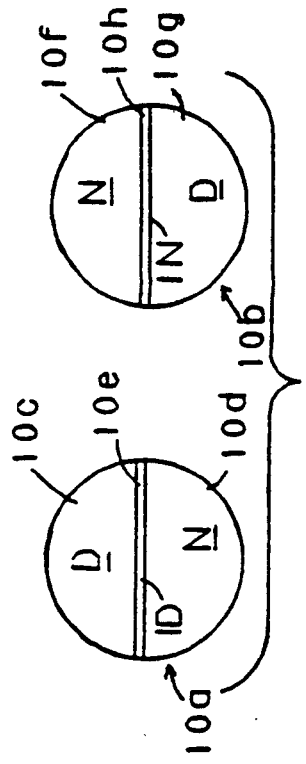
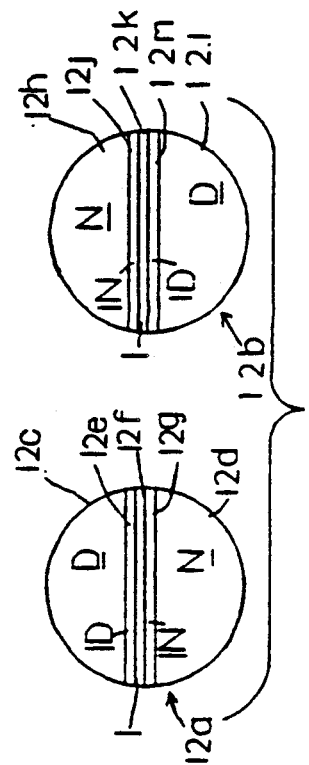
FIG. 10  FIG. 12
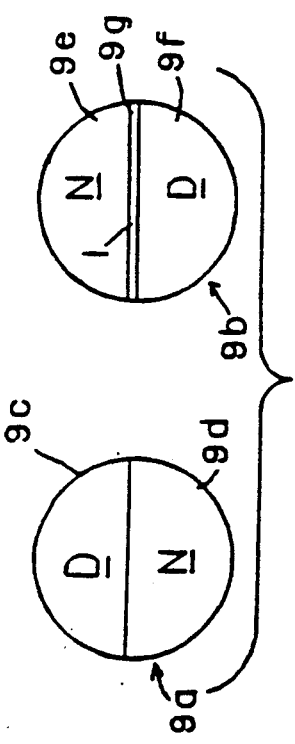
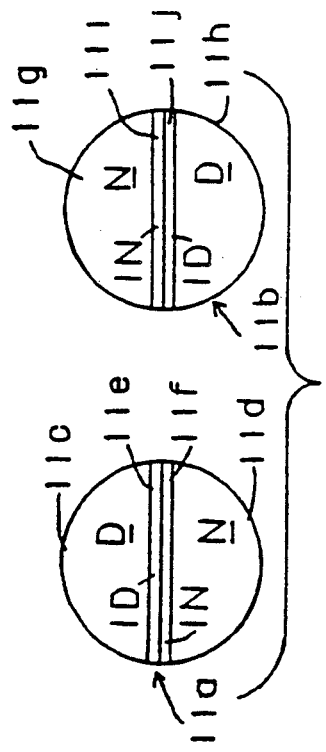
FIG. 9  FIG. 11

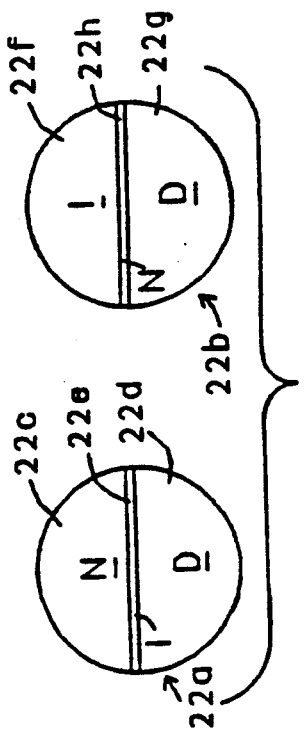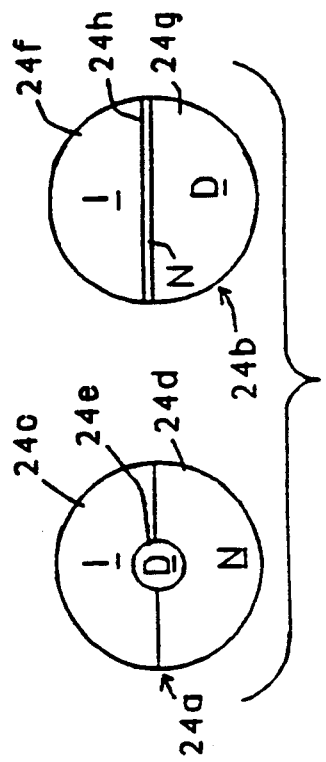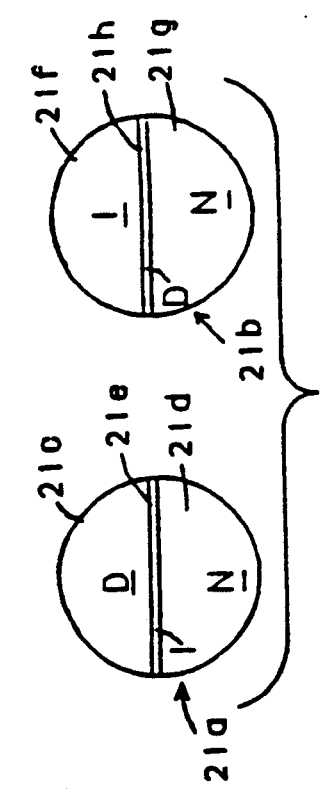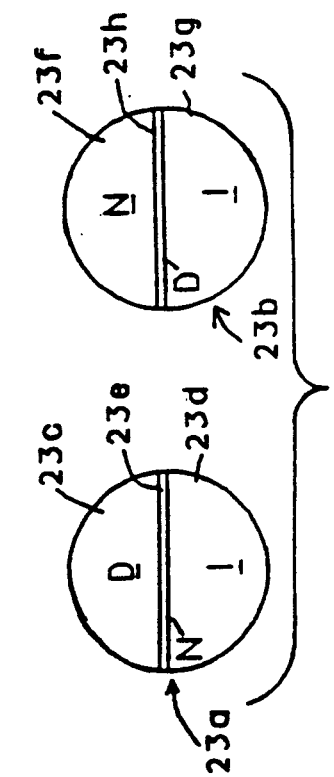

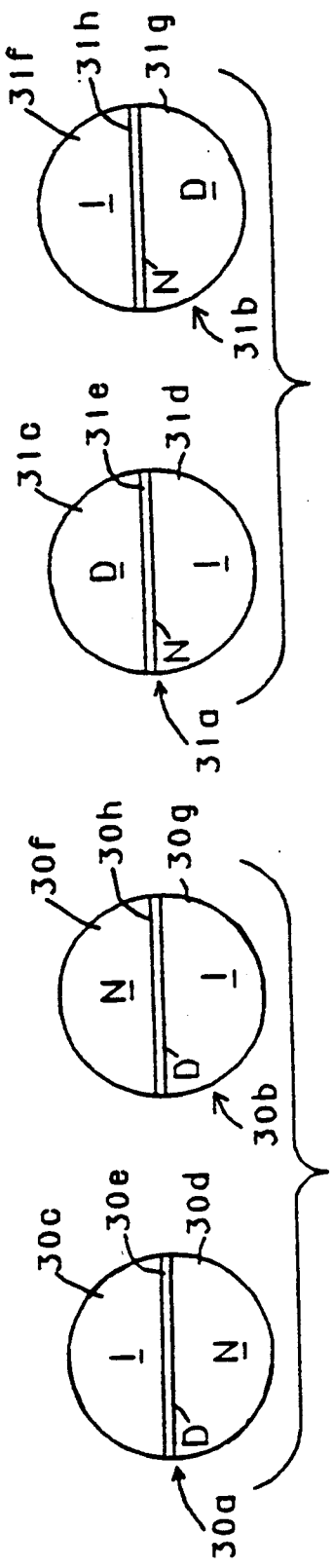
FIG. 30
FIG. 31
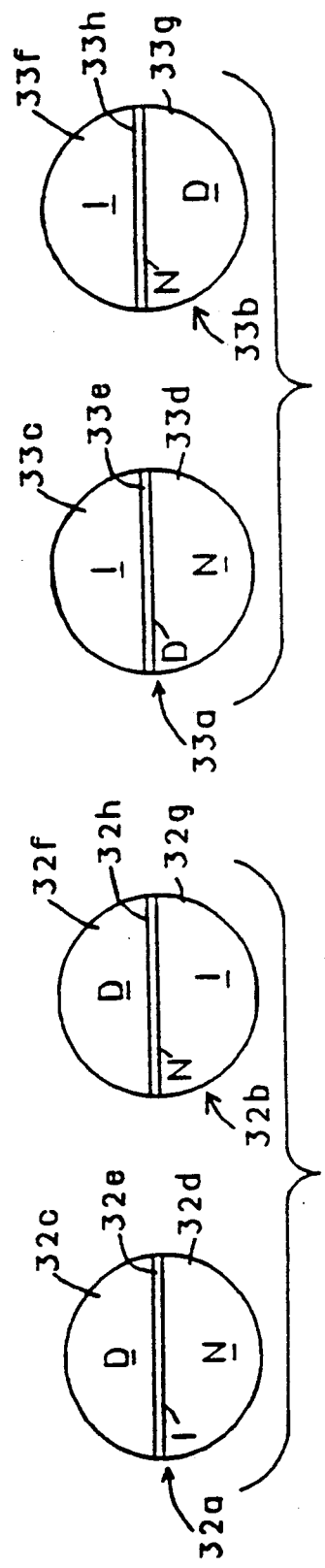
FIG. 32
FIG. 33

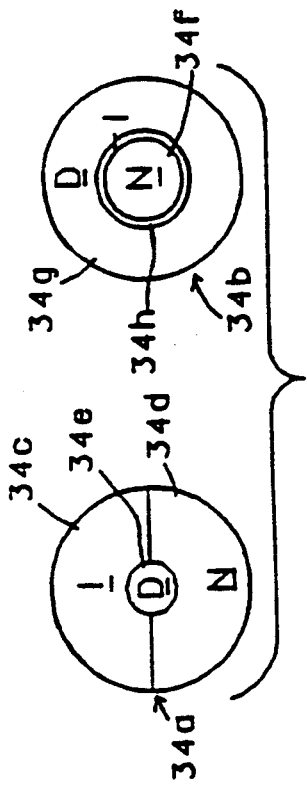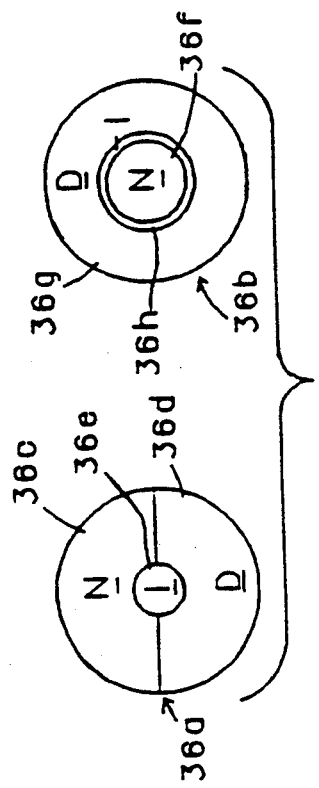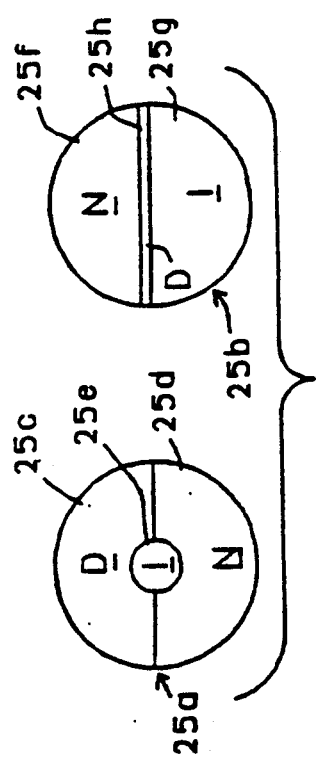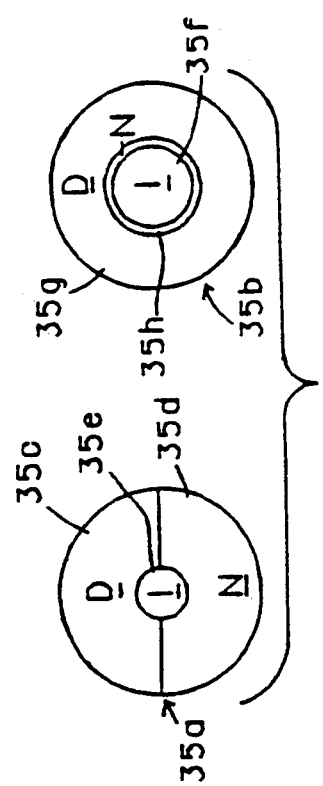

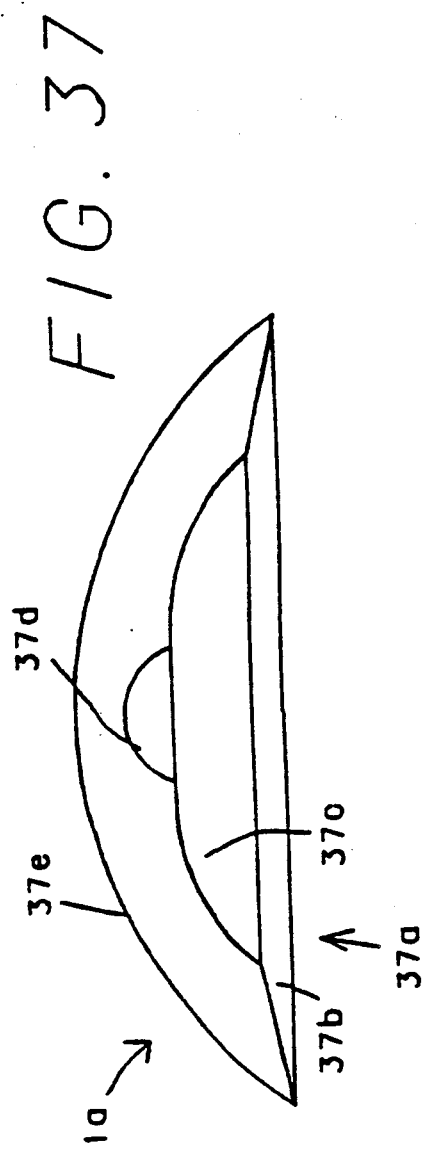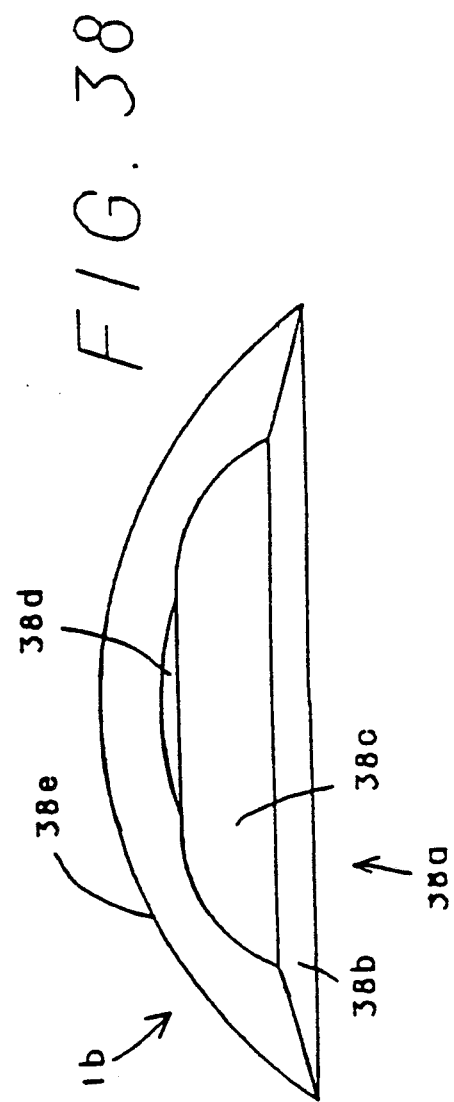

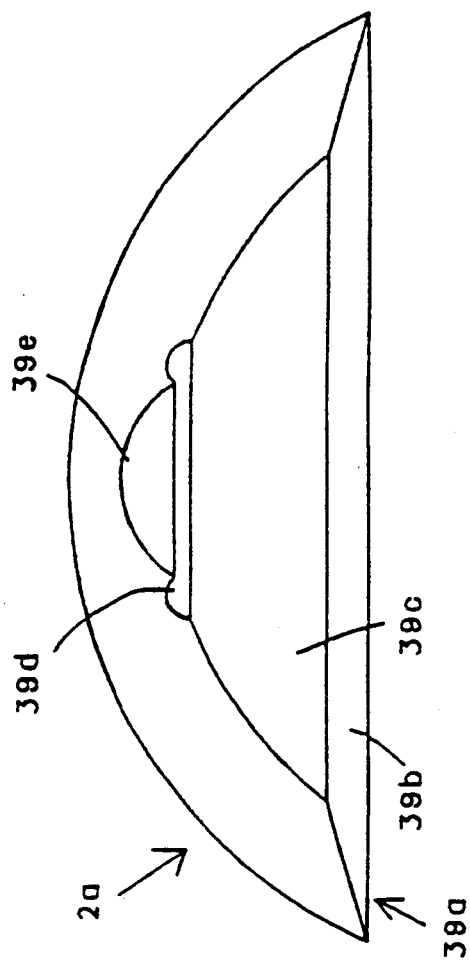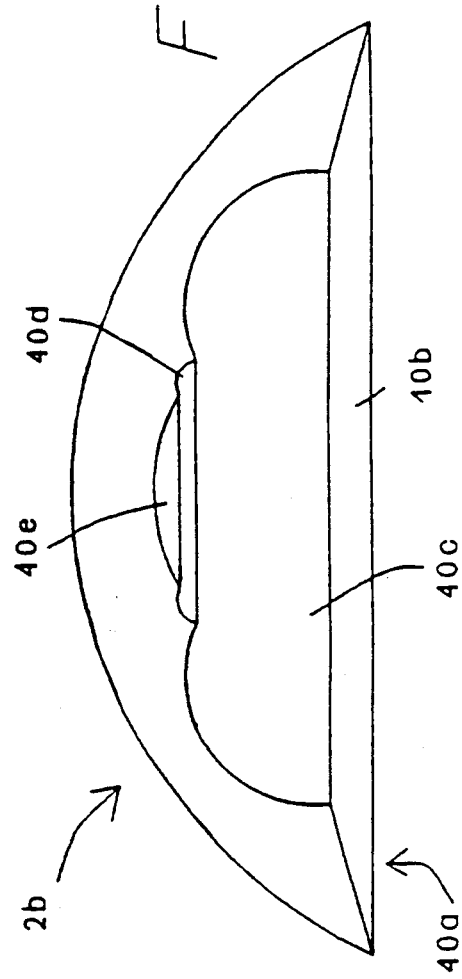

MULTIFOCAL CORNEAL CONTACT LENSES

BACKGROUND OF THE INVENTION

This invention relates to corneal contact lenses and more particularly to multifocal corneal contact lenses.

Multifocal contact lenses are designed to correct a condition of advancing age known as "presbyopia." In a presbyopic eye, ability to focus at near distances, such as the normal reading distance, and in some cases at great distances is diminished. The loss of focusing capability is due to hardening of the eye's natural crystalline lens material.

Generally, multifocal contact lenses (usually either bifocal, trifocal or aspheric) are concentric or segmented in configuration. In a conventional bifocal contact lens of the concentric type, a first, centrally located, circular correction zone constitutes either distant or near vision correction, while a second annular correction zone surrounding the first zone provides the corresponding near or distance vision correction, respectively. In a conventional bifocal contact lens of the segmented type, the lens is divided into two somewhat D-shaped zones. Usually the upper area is for distant vision correction, whereas the lower area is for near vision correction. Such conventional segmented contact lenses require some sort of shifting of the lens relative to the eye to achieve acceptable visual acuity for both distant and near vision.

A trifocal contact lens has a third correction zone whose focal length is between the focal lengths of the distant vision and the near vision zones. The third correction zone may be termed a middle, or intermediate, distance correction zone.

Because of the multiplicity of foci, conventional multifocal contact lenses often produce a perceived image which is blurred. Such a situation worsens as illumination decreases, such as during night driving. With reduced illumination, the pupil enlarges in diameter, and consequently more light simultaneously enters the eye through both the distant vision correction zone and the near vision correction zone. This overlapping imagery increases the blur within the eye and reduces acuity and contrast of vision. The user's brain is usually not capable of ignoring the blurry portion of the image in favor of the focused portion.

OBJECTS OF THE INVENTION

An object of the present invention is to provide improved contact lenses for the correction of presbyopia.

Another object of the present invention is to provide improved pairs of multifocal corneal contact lenses.

Another, more particular, object of the present invention is to provide multifocal corneal contact lenses which minimize or avoid the above-mentioned disadvantage.

SUMMARY OF THE INVENTION

Pursuant to a general embodiment of the present invention, a pair of multifocal corneal contact lenses comprises a first contact lens for one eye of a patient and a second, differently configured lens for the other eye of the patient. The first lens has a first distant vision correction zone and a first near vision correction zone. The second contact lens has a first correction zone and a second correction zone, the first correction zone corresponding substantially in size, shape and location to the distant vision correction zone of the first contact lens, and the second correction zone corresponding substantially in size, shape and location to the near vision correction zone of the first contact lens. The first correction zone of the second contact lens constitutes a second near vision correction zone, the second correction zone constituting a second distant vision correction zone. Thus, in the second contact lens, the distant vision correction zone and the near vision correction zone are reversed with respect to the first contact lens. In addition, at least one of the two contact lenses has an intermediate distance correction zone separating the distant vision correction zone from the near vision correction zone of that lens.

Pursuant to another feature of the present invention, a plurality of intermediate distance correction zones may be disposed between the distant vision correction zone and the near vision correction zone of either or both of the contact lenses. Preferably, one of the intermediate distance correction zones of the first contact lens has a focal length in the same focal range as the focal length of one of the intermediate distance correction zones of the other contact lens. The other intermediate distance correction zone or zones of each lens may then have focal lengths ranges closer to the focal length of one or the other of the distant vision correction zone and the near vision correction zone of the respective lens.

The distant vision correction zones and near vision correction zones of the two lenses may have any of a number of different geometric configurations. For example, the correction zones may be concentrically arranged or may take D shapes (segmented lenses). More particularly, the first distant vision correction zone (first lens) may occupy a circular area and the first near vision correction zone (first lens) may occupy an annular area surrounding the first distant vision correction zone. Likewise, the second near vision correction zone (second lens) may occupy a circular area, while the second distant vision correction zone occupies an annular area around the second near vision correction zone.

In a particular embodiment of the invention, each concentrically configured lens is provided with a plurality of annular intermediate distance correction zones between the circular inner zone and the annular outer zone. One of the intermediate distance correction zones in any particular lens may take the form of an intermediate-distant vision correction zone, while another intermediate distance vision correction zone may take the form of an intermediate-near vision correction zone. Alternatively or in addition, a true intermediate distance correction zone may be provided.

Pursuant to yet another feature of the present invention, the centrally located, circular correction zone of a concentrically configured lens, whether a distant vision correction zone or a near vision correction zone, has an area equal to approximately two-thirds of a minimum area (high illumination) subtended by the respective pupil of the patient. In addition, in a lens having at least two correction zones, it is advantageous if that portion of the outer, annular correction zone coextensive with the pupil in a maximally opened state thereof occupies an area equal to at least two-thirds of the area of the pupil in its maximally opened state (low illumination).

In accordance with another general embodiment of the present invention, a pair of multifocal corneal contact lenses includes a first contact lens for one eye of a patient, the lens having a distant vision correction zone, a near vision correction zone and an intermediate distance correction zone. A second contact lens for the other eye of the patient has a first correction zone, a second correction zone and a third correction zone, wherein the first correction zone corresponds generally in shape and location to the distant vision correction zone of the first contact lens, the second correction zone corresponds generally in shape and location to the near vision correction zone of the first contact lens, and the third correction zone corresponds generally in shape and location to the intermediate distance correction zone of the first contact lens. One of the correction zones of the second lens has a focal length in the same focal range as the focal length of the corresponding zone of the first contact lens, whereas the other two correction zones each have a focal length in the same focal range as the other of the remaining two zones of the first contact lens, whereby those other two zones are switched with respect to the first contact lens.

The zone which is in the same focal range and has the same relative geometric location in the two lenses may be a distant vision correction zone, a near vision correction zone or an intermediate distance correction zone and may be, in a concentrically configured lens, a circular centrally located correction zone, an annular middle correction zone or an annular outer correction zone. In most specific applications, the first correction zone, the second correction zone and the third correction zone have relative sizes different from relative sizes of the distant vision correction zone, the near vision correction zone and the intermediate distance correction zone.

Pursuant to a first specific form of the invention, both lenses have a distant vision correction zone in the shape of a circular region at the center of the respective lens. In that case, one lens has an annular middle area which is an intermediate distance correction zone; the other lens has an outer annular area which is an intermediate distance correction zone and an annular middle area which is a near vision correction zone. Alternatively, the circular central region in both lenses may be an intermediate distance correction zone (or a near vision correction zone), while the outer annular correction zone of one lens is a near vision correction zone (or a distant vision correction zone) and the outer correction zone of the other lens is an intermediate distance correction zone.

In another specific form of the invention, the middle (annular) correction zones in the two lenses have focal lengths in a common focal range, while the focal lengths of the circular central zone and of the outer, annular zone are switched from the one lens to the other. Thus, if the middle zone in both lenses is an intermediate distance correction zone, the central zone of one lens is a near vision correction zone and the central zone of the other lens is a distant vision correction zone and vice versa for the outer, annular zones. Alternatively, the middle, annular zone of both lenses may be either a distant vision correction zone or a near vision correction zone.

In yet another specific form of the invention, the outer (annular) vision correction zones of the two lenses have focal lengths in a common focal range, and the focal lengths of the circular central zone and of the inner, annular zone are switched from the one lens to the other. Thus, if the outer zone in both lenses is a distant vision correction zone, the central zone of one lens is a near vision correction zone and the central zone of the other lens is an intermediate distance correction zone and vice versa for the inner, annular zones. Alternatively, the outer, annular zone of both lenses may be either a near vision correction zone or an intermediate distance correction zone.

In accordance with yet another general embodiment of the present invention, a pair of multifocal corneal contact lenses comprises a first contact lens for one eye of a patient, the lens having a first correction zone and a second correction zone concentrically disposed with respect to one another, and a second contact lens for the other eye of the patient, the second contact lens having a third correction zone and a fourth correction zone concentrically disposed with respect to one another. The first correction zone and the third correction zone are each circular, while the second and the fourth correction zone are each annular in plan view of the respective contact lens. The first correction zone and the fourth correction zone each constitutes a distant vision correction zone, whereas the second correction zone and the third correction zone each constitutes a near vision correction zone. The first correction zone and the third correction zone each have an area equal to approximately two-thirds of a minimum area subtended by the respective pupil of the patient.

Pursuant to another feature of the invention, a portion of the second correction zone and a portion of the fourth correction zone coextensive with the pupil of the respective eye in a maximally opened state of such pupil each cover an area equal approximately to at least two-thirds of the area subtended by the respective pupil in the maximally opened state. In some cases, the second correction zone is immediately adjacent the first correction zone and the fourth correction zone is immediately adjacent the third correction zone. In other cases, the first contact lens has a first annular intermediate distance correction zone between the first correction zone and the second correction zone, and the second contact lens has a second annular intermediate distance correction zone disposed between the third correction zone and the fourth correction zone.

In a pair of contact lenses pursuant to this general embodiment of the present invention, one lens is a near vision lens and the other is a distant vision lens during periods of high illumination (minimum pupil size), while the lenses reverse function during periods of low illumination (maximum pupil size) so that the first lens then functions as a distant vision correction lens and the second lens functions as a near vision correction lens. The limitations on pupil area subtended by the correction zones during extremes of ambient illumination minimizes blurring and optimizes visual acuity. During periods of intermediate and low illumination, vision is also, to some extent, stereoscopic.

A pair of multifocal corneal contact lenses comprises, in accordance with yet another embodiment of the present invention, a first contact lens for one eye of a patient and a second contact lens for the other eye of the patient. The first lens has a first correction zone and second correction zone, the first correction zone having a focal length in a first focal range and the second correction zone having a focal length in a second focal range. The second contact lens has a third correction zone and a fourth correction zone, the third correction zone corresponding generally in shape and location to the first correction zone, the fourth correction zone corresponding generally in shape and location to the second correction zone. The third correction zone has a focal length in the second focal range and the fourth correction zone has a focal length in the first focal range. At least one of the contact lenses has on an anterior side a continuous surface with essentially a single radius of curvature and is provided on a posterior side with a cornea matching surface extending annularly along a periphery of the lens. That posterior side is further formed with at least one concave surface having a radius of curvature smaller than any radius of curvature of the cornea matching surface, the concave surface being radially spaced from a geometric center of the lens.

BRIEF DESCRIPTION OF THE DRAWING

FIGS. 1 through 12 are plan views of pairs of contact lenses in accordance with a general embodiment of the present invention.

FIGS. 16 through 23 and 26 through 33 are plan views of pairs of contact lenses in accordance with another general embodiment of the present invention.

FIGS. 24, 25 and 34 through 36 are plan views of additional pairs of contact lenses in accordance with the present invention.

FIG. 37 is a cross-sectional view taken along line A—A in FIG. 1.

FIG. 38 is a cross-sectional view taken along line B—B in FIG. 1.

FIG. 39 is a cross-sectional view taken along line C—C in FIG. 2.

FIG. 40 is a cross-sectional view taken along line E—E in FIG. 2.

DETAILED DESCRIPTION

Figure 1:
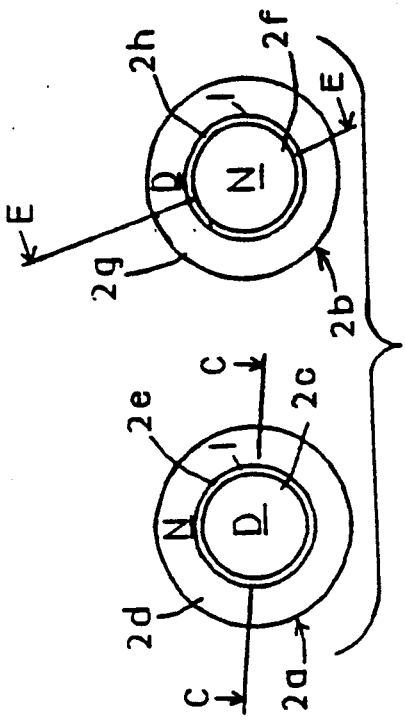

All of the drawings in this application illustrate pairs of corneal contact lenses with members having multiple correction zones which differ in configuration from one to the other to provide improved multifocal type corrections for presbyopia. One member of each pair is intended for one eye of a patient, while the other member is intended for the other eye.

FIGS. 1 through 12 all illustrate multifocal contact lenses wherein a first contact lens of a pair has a first distant vision correction zone and a first near vision correction zone in a pre-established configuration and a second contact lens of the pair has at least a first correction zone and a second correction zone, wherein the first correction zone corresponds at least generally in shape and location to the distant vision correction zone of the first contact lens and the second correction zone corresponds at least generally in shape and location to the near vision correction zone of the first contact lens, and wherein the first correction zone constitutes a second near vision correction zone and the second correction zone constitutes a second distant vision correction zone.

It is to be noted that, for purposes of simplifying the drawing, the plan views of FIGS. 1 through 36 have omitted a representation of an annular peripheral cornea matching zone included in each lens pursuant to conventional lens design. These corneal matching areas are shown in the cross-sectional views of FIGS. 37 through 42.

As shown in FIG. 1, a first contact lens 1a of a pair of multifocal corneal contact lenses includes a circular distant vision correction zone 1c surrounded by an annular near vision correction zone 1d. A second contact lens 1b of the pair includes a circular near vision correction zone 1e surrounded by an annular distant vision correction zone 1f.

Figure 2:
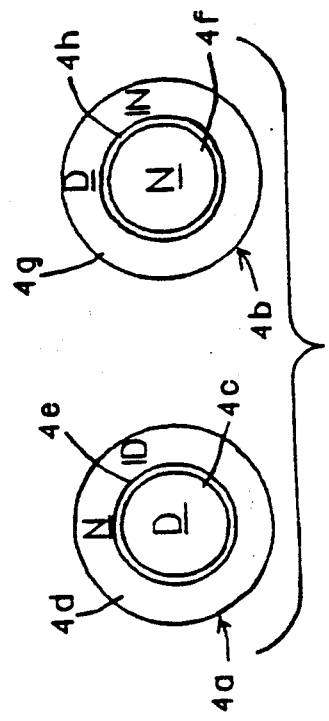

FIG. 2 illustrates a pair of multifocal corneal contact lenses 2a and 2b, wherein the first lens 2a includes a circular distant vision correction zone 2c and an annular, outer near vision correction zone 2d separated by an annular middle intermediate distance correction zone 2e. The second lens 2b of the pair also includes three correction zones 2f, 2g and 2h arranged concentrically with respect to one another. Circular center zone 2f is a near vision correction zone, whereas outer zone 2g is a distant vision correction zone and middle zone 2h is an intermediate distance correction zone. Correction zones 2e and 2h have focal lengths which are in the same range (the intermediate distance correction zone range).

Figure 3:
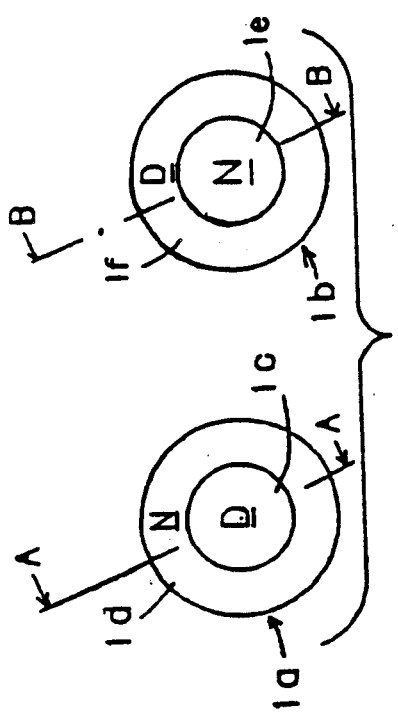

FIG. 3 depicts a pair of multifocal corneal contact lenses 3a and 3b wherein lens 3a is identical to lens 2a and thus includes a circular distant vision correction zone 3c and an annular, outer near vision correction zone 3d separated by an annular middle intermediate distance correction zone 3e. Lens 3b is identical to lens 1b and thus includes a circular near vision correction zone 3f surrounded by an annular distant vision correction zone 3g.

Preferably, the inner, circular correction zones 1c, 1e, 2c, 2f and 3c, 3f of the lenses shown in FIGS. 1 through 3 each have an area equal to at least two-thirds (preferably seventy-five percent and most preferably eighty percent) of a minimum area subtended by the respective pupil of the patient. This area distribution is believed to optimally minimize blurring during periods of high illumination.

Lens 1a is a distant vision lens for high illumination and a near vision lens for low illumination. The reverse applies to lens 1b: it is a near vision lens at high levels of illumination and a distant vision lens at low illumination. In order to optimize visual acuity in those lenses, it is also recommended that the portion of each of the outer zones 1d and 1f coextensive with the pupil of the respective eye during periods of low illumination covers at least approximately two-thirds of the respective pupil (preferably seventy-five percent and most preferably eighty percent).

Similarly, lenses 2a and 3a are distant vision lenses for high illumination and near vision lenses in situations of low illumination, while lenses 2b and 3b are near vision lenses in situations of high illumination and distant vision lenses during periods of low illumination. Near vision correction zones 2d and 3d and distant vision correction zones 2g and 3g should be so dimensioned, for purposes of maximizing visual acuity, that the portion of each of those outer zones 2d, 3d, 2g, and 3g coextensive with the pupil of the respective eye during periods of low illumination covers at least approximately two-thirds of the respective pupil (preferably seventy-five percent and most preferably eighty percent).

Figure 4:
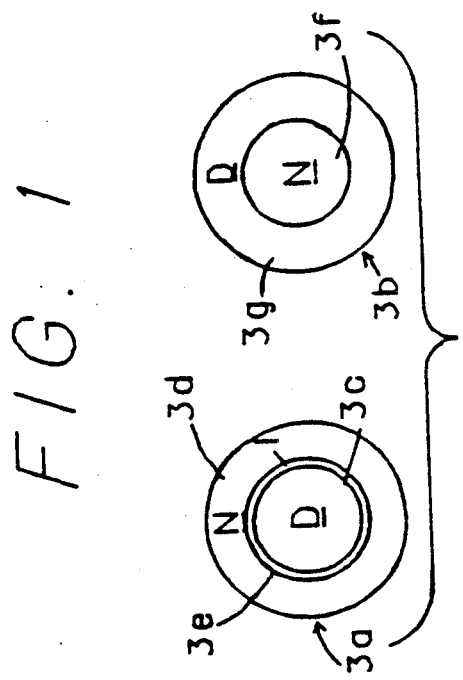

FIG. 4 illustrates a pair of multifocal corneal contact lenses 4a and 4b, wherein the first lens 4a includes a circular distant vision correction zone 4c and an annular, outer near vision correction zone 4d separated by an annular middle intermediate-distant vision correction zone 4e. The second lens 4b of the pair also includes three correction zones 4f, 4g and 4h arranged concentrically with respect to one another. Circular center zone 4f is a near vision correction zone, whereas outer zone 4g is a distant vision correction zone and middle zone 4h is an intermediate-near vision correction zone. Correction zones 4e and 4h advantageously have focal lengths which are generally closer to the focal lengths of the respective inner zones 4c and 4f than the focal lengths of intermediate distance correction zones 2e and 2h are to the focal lengths of inner zones 2c and 2f, respectively.

The discussion hereinabove with respect to the sizes of the inner and outer correction zones of the lenses of FIGS. 1 through 3 also applies to the multifocal corneal contact lenses illustrated in FIG. 4.

As illustrated in FIG. 5, one contact lens 5a has a circular innermost correction zone 5c separated from an annular outermost correction zone 5d by two annular middle correction zones 5e and 5f. Innermost and outermost zones 5c and 5d take the form of a distant vision correction zone and a near vision correction zone respectively, while annular middle zones 5e and 5f are an intermediate-distant vision correction zone and a true intermediate distance correction zone, respectively. Thus, the focal length of middle zone 5f is shorter than the focal length of middle zone 5e.

Similarly, second contact lens 5b of the pair shown in FIG. 5 has a circular innermost correction zone 5g separated from an annular outermost correction zone 5h by two annular middle correction zones 5i and 5j. Innermost and outermost zones 5g and 5h are a near vision correction zone and a distant vision correction zone, respectively, while annular middle zones 5i and 5j are an intermediate-near vision correction zone and a true intermediate distance correction zone, respectively. The focal length of middle zone 5j is longer than the focal length of middle zone 5i.

FIG. 6 depicts a pair of multifocal corneal contact lenses 6a and 6b wherein lens 6a has a circular innermost correction zone 6c separated from an annular outermost correction zone 6d by three annular middle correction zones 6e, 6f and 6g. Innermost and outermost zones 6c and 6d are a distant vision correction zone and a near vision correction zone. Annular middle zones 6e and 6g are an intermediate-distant vision correction zone and a intermediate-near vision correction zone, respectively. Middle zone 6f is a true intermediate distance correction zone. Thus, the focal length of middle zone 6f is shorter than the focal length of middle zone 6e and longer than the focal length of middle zone 6g.

Similarly, second contact lens 6b of the pair shown in FIG. 6 has a circular innermost correction zone 6h separated from an annular outermost correction zone 6i by three annular middle correction zones 6j, 6k and 6m. Innermost and outermost zones 6h and 6i are a near vision correction zone and a distant vision correction zone, while annular middle zones 6j and 6m are an intermediate-near vision correction zone and an intermediate distant vision correction zone. Middle zone 6k is a true intermediate distance correction zone, the focal length of middle zone 6k being longer than the focal length of middle zone 6j and shorter than the focal length of intermediate distance correction zone 6m.

In a preferred embodiment of the present invention, the middle correction zones 6e, 6f, 6g, 6j, 6k and 6m have a radial dimension or width substantially thinner than the radial dimension of outer correction zones 6d and 6i or the radii of inner correction zones 6c and 6h.

Such relative dimensions are preferred in order to optimize visual acuity, as discussed hereinabove. Moreover, it is to be noted that the relative widths of the correction zones of one lens 6a may be, depending on the application (e.g., the particular patient's condition), different than the relative widths of the correction zones of the other lens 6b.

As shown in FIG. 7, in a pair of multifocal corneal contact lenses 7a and 7b, a first lens 7a has a D-shaped distant vision correction zone 7c disposed above a D-shaped near vision correction zone 7d. Another lens 7b has a D-shaped near vision correction zone 7e disposed above a D-shaped distant vision correction zone 7f.

In a more preferred specific embodiment of the invention, illustrated in FIG. 8, a first lens 8a includes an upper, D-shaped distant vision correction zone 8c separated by a strip-shaped intermediate distance correction zone 8e from a lower, D-shaped near vision correction zone 8d. A second lens 8b comprises an upper, D-shaped near vision correction zone 8f separated by a strip-shaped intermediate distance correction zone 8h from a lower, D-shaped distant vision correction zone 8g.

In a pair of multifocal corneal contact lenses 9a and 9b shown in FIG. 9, a first lens 9a is identical to lens 7a while another lens 9b is identical to lens 8b. Accordingly, lens 9a includes a D-shaped distant vision correction zone 9c disposed above a D-shaped near vision correction zone 9d, while lens 9b includes an upper, D-shaped near vision correction zone 9e separated by a strip-shaped intermediate distance correction zone 9g from a lower, D-shaped distant vision correction zone 9f.

In another specific embodiment of the invention, illustrated in FIG. 10, a first lens 10a includes an upper, D-shaped distant vision correction zone 10c separated by a strip-shaped intermediate-distant vision correction zone 10e from a lower, D-shaped near vision correction zone 10d. A second lens 10b comprises an upper, D-shaped near vision correction zone 10f separated by a strip-shaped intermediate-near vision correction zone 10h from a lower, D-shaped distant vision correction zone 10g.

FIG. 11 is an illustration of a first contact lens 11a having two substantially D-shaped terminal correction zones 11c and 11d and two substantially strip-shaped correction zones 11e and 11f between D-shaped zones 11c and 11d. A second contact lens of the pair includes two substantially D-shaped terminal correction zones 11g and 11h and substantially strip-shaped correction zones 11i and 11j between D-shaped zones 11g and 11hi.

D-shaped zones 11c and 11h are distant vision correction zones, while D-shaped zones 11d and 11g are near vision correction zones. Zones 11e and 11j are intermediate-distant vision correction zones, while zones 11f and 11i are intermediate-near vision correction zones. For example, distant vision correction zones 11c and 11h may a substantially the same focal length, depending on the focal powers of the respective eyes of the patient. Likewise, intermediate-near vision correction zones 11f and 11i may have the same focal length, if required by the eyes of the patient.

As depicted in FIG. 12, a pair of multifocal corneal contact lenses 12a and 12b includes a first contact lens 12a having a D-shaped distant vision correction zone 12c and a D-shaped near vision correction zone 12d separated from one another by three substantially strip-shaped correction zones 12e, 12f and 12g. A second contact lens 12b of the pair includes a D-shaped near vision correction zone 12h and a D-shaped distant vision correction zone 12i separated from one another by three substantially strip-shaped correction zones 12j, 12k and 12m.

Zones 12e and 12g are an intermediate-distant vision correction zone and an intermediate-near vision correction zone, respectively, while zones 12j and 12m are an intermediate-near vision correction zone and an intermediate-distant vision correction zone, respectively. Middle zones 12f and 12k are intermediate distance correction zones. Middle zone 12f has a focal length less in value than a focal length of intermediate-distant vision correction zone 12e and greater in value than the focal length of intermediate-near vision correction zone 12g. Middle zone 12k has a focal length less in value than a focal length of intermediate-distant vision correction zone 12m and greater in value than the focal length of intermediate-near vision correction zones 12j.

Figure 13:
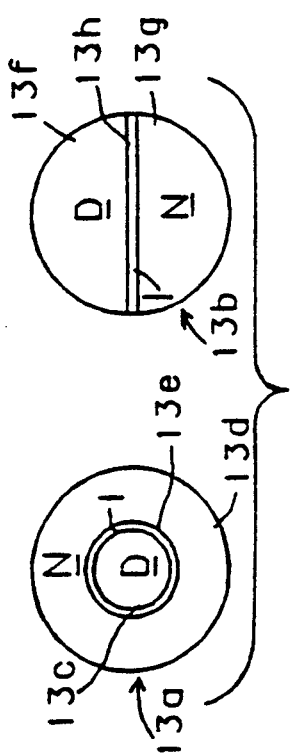
FIG. 13, 14 and 15 are plan views of further pairs of contact lenses in accordance with the present invention.

A pair of multifocal corneal contact lenses 13a and 13b shown in FIG. 13 include a first lens 13a identical to lens 3a and a second lens 13b identical to lens 8a. Thus, lens 13a includes a circular distant vision correction zone 13c and an annular, outer near vision correction zone 13d separated by an annular middle intermediate distance correction zone 13e, while lens 13b includes an upper, D-shaped distant vision correction zone 13f separated by a strip-shaped intermediate distance correction zone 13h from a lower, D-shaped near vision correction zone 13g.

Figure 14:
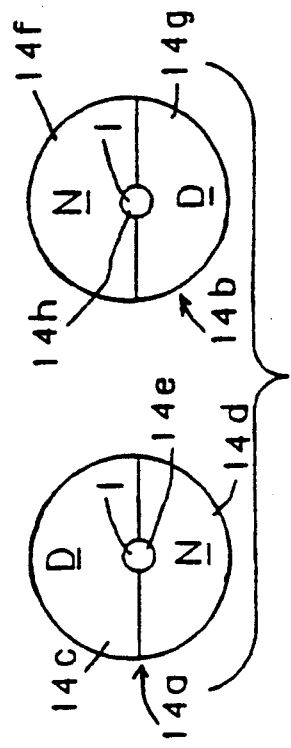

FIG. 14 shows a first contact lens 14a having a circular intermediate distance correction zone 14e at the center. A substantially D-shaped distant vision correction zone 14c is on an upper side of zone 14e opposite a near vision correction zone 14d. Distant vision correction zone 14c and near vision correction zone 14d are partially separated from one another by intermediate distance correction zone 14e and are contiguous with one another along a line on opposite sides of zone 14e.

In a second lens 14b of the pair shown in FIG. 14, a circular intermediate distance correction zone 14h is disposed at the center of the lens between a substantially D-shaped near vision correction zone 14f on an upper side of the lens and a distant vision correction zone 14g on a lower side of the lens. Near vision correction zone 14f and distant vision correction zone 14g are partially separated from one another by intermediate distance correction zone 14h and are contiguous with one another along a line on opposite sides of zone 14h.

Figure 15:
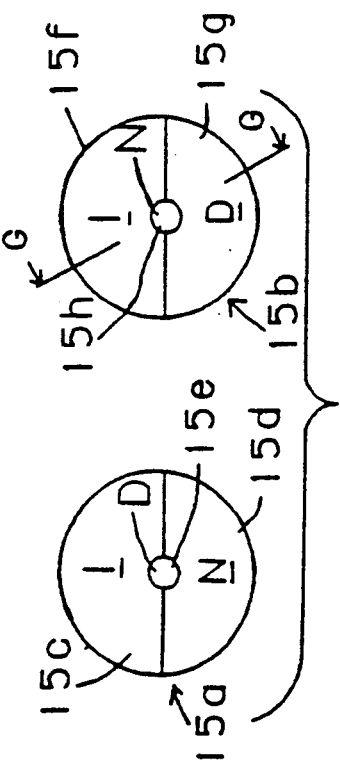

As depicted in FIG. 15, in a pair of multifocal corneal contact lenses 15a and 15b, a first lens 15a has a circular distant vision correction zone 15e disposed between an upper D-shaped intermediate distance correction zone 15c and a lower D-shaped near vision correction zone 15d. In a second lens 15b, a circular near vision correction zone 15h is disposed between an upper D-shaped intermediate distance correction zone 15f and a lower D-shaped distant vision correction zone 15g.

FIGS. 16 through 30 all illustrate multifocal contact lenses wherein a first contact lens has a distant vision correction zone, a near vision correction zone and an intermediate distance correction zone, while a second contact lens has a first correction zone, a second correction zone and a third correction zone, the first correction zone corresponding substantially in size, shape and location to the distant vision correction zone of the first contact lens, the second correction zone corresponding substantially in size, shape and location to the near vision correction zone of the first contact lens, and the third correction zone corresponding in size, shape and location to the intermediate distance correction zone of the first contact lens. One of the correction zones of the second contact lens has a focal length in the same focal range as the focal length of the corresponding zone of the first contact lens. More particularly stated, two contact lens zones which have the same geometry and position in the two lenses are both distant vision correction zones, intermediate distance correction zones or near vision correction zones. The other two zones of the second lens are reversed with respect to the first lens: if the remaining zones of the first lens are termed "P" and "Q" and the geometrically corresponding zones of the second lens are respectively termed "P'" and "Q,'" the focal lengths of zones P and Q' lie in the same focal range (i.e., both such zones are distant vision correction zones, intermediate distance correction zones or near vision correction zones), while the focal lengths of zones P' and Q lie in the same range.

Figure 16:
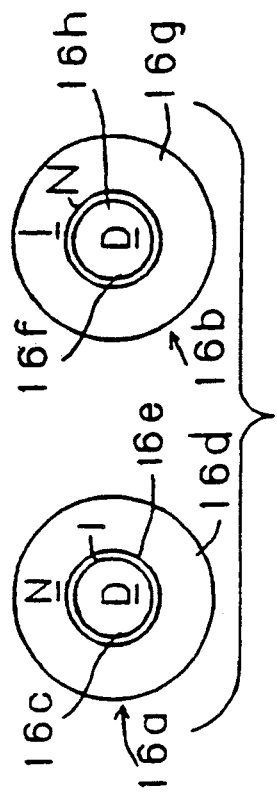

FIG. 16 illustrates a pair of multifocal corneal contact lenses 16a and 16b, wherein the first lens 16a includes a circular distant vision correction zone 16c and an annular, outer near vision correction zone 16d separated by an annular middle intermediate distance correction zone 16e. In contrast, the second lens 16b includes a circular distant vision correction zone 16f at the center of the lens and an annular, outer intermediate distance correction zone 16g separated by an annular middle near vision correction zone 16h.

In contact lenses 16a and 16d, intermediate distance correction zones 16e and 16g are preferably substantially thinner (radial dimension) than near vision correction zones 16d and 16h. By way of example, intermediate distance correction zones 16e and 16g may have widths of a fraction of a millimeter, while near vision correction zones 16d and 16h may have widths up to several millimeters. Thus, it is clear that the relative widths of correction zones 16c, 16d and 16e may be different from the relative widths of correction zones 16f, 16g and 16h.

Figure 17:
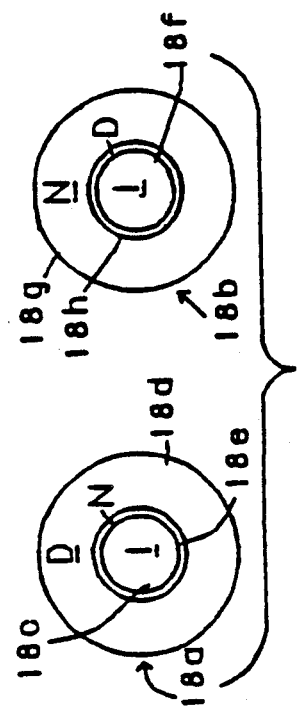

As shown in FIG. 17, a pair of multifocal corneal contact lenses 17a and 17b includes a first contact lens 17a with a circular near vision correction zone 17c at the center of the lens and an annular intermediate distance correction zone 17d at the periphery of the lens. Near vision correction zone 17c and intermediate distance correction zone 17d are spaced from one another by an annular distant vision correction zone 17e. The second lens 17b of the pair also includes three correction zones 17f, 17g and 17h arranged concentrically with respect to one another. Circular center zone 17f is a near vision correction zone, whereas outer zone 17g is a distant vision correction zone and middle zone 17h is an intermediate distance correction zone.

The correction zones of lenses 17a and 17b may have relative widths which vary from lens to lens. In particular, intermediate distance correction zones 17d and 17h will generally have widths which are several times smaller than the widths of distant vision correction zones 17e and 17g.

Figure 18:
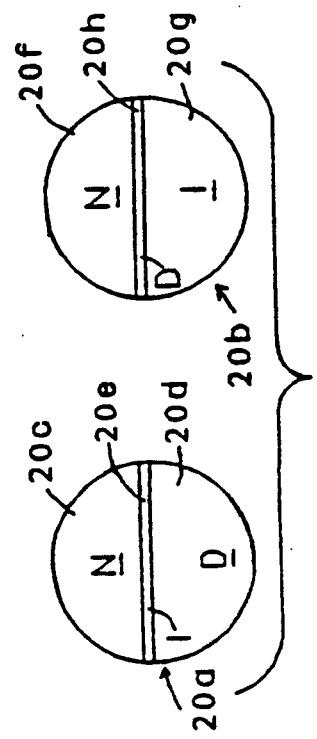

In a pair of multifocal corneal contact lenses 18a and 18b depicted in FIG. 18, a first lens 18a comprises a circular intermediate distance correction zone 18c at the geometric center of the lens, an annular distant vision correction zone 18d at the outer edge of the lens, and an annular near vision correction zone 18e separating the circular center zone from the annular peripheral zone.

The second lens 18b has a circular inner zone 18f in the form of an intermediate distance correction zone, an annular peripheral zone 18g in the form of a near vision correction zone, and an annular middle zone 18h in the form of a distant vision correction zone. In the embodiment illustrated in FIG. 18, the centrally located, intermediate distance correction zones 18c and 8f are generally substantially smaller than the annular correction zones 18d, 18e and 18g and 18h.

Figure 19:
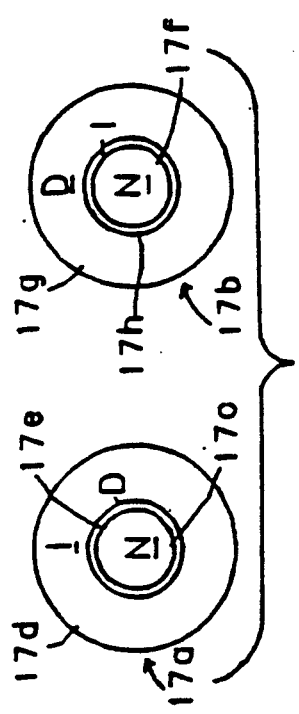

A first contact lens 19a of pair of multifocal corneal contact lenses 19a and 19b illustrated in FIG. 19 includes three concentric vision correction zones 19c, 19d and 19e. The first zone 19c, located at the center of the lens, is a near vision correction zone, while the second zone 19d, located at the edge of the lens, is an intermediate distance correction zone and the third zone 19e, located between the first two, is a distant vision correction zone. The second lens 19b of the pair includes a circular intermediate distance correction zone 19f at the center of the lens and two surrounding ring-shaped zones 19g and 19h. Outer ring 19g is a near vision correction zone, whereas inner ring 19h is a distant vision correction zone.

Figure 20:
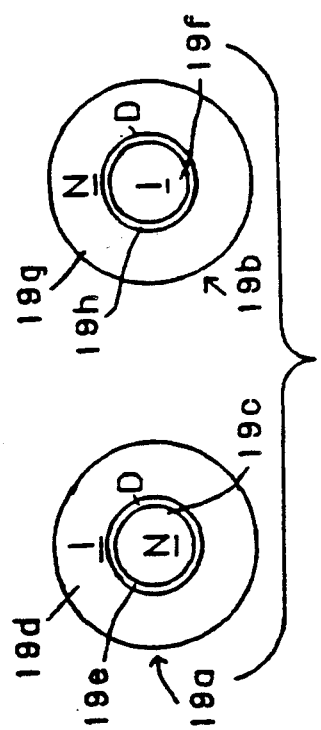

FIG. 20 illustrates a pair of multifocal corneal contact lenses 20a and 20b, wherein the first lens 20a includes a circular distant vision correction zone 20c and an annular, outer intermediate distance correction zone 20d separated by an annular middle near vision correction zone 20e. In contrast, the second lens 20b includes a circular intermediate distance correction zone 20f at the center of the lens and an annular, outer distant vision correction zone 20g separated by an annular middle near vision correction zone 20h.

As shown in FIG. 21, a pair of multifocal corneal contact lenses 21a and 21b includes a first contact lens 21a with a circular near vision correction zone 21c at the center of the lens and an annular distant vision correction zone 21d at the periphery of the lens. Near vision correction zone 21c and distant vision correction zone 21d are spaced from one another by an annular intermediate distance correction zone 21e. The second lens 21b of the pair also includes three correction zones 21f, 21g and 21h arranged concentrically with respect to one another. Circular center zone 21f is an intermediate distance correction zone, whereas outer zone 21g is a distant vision correction zone and middle zone 21h is a near vision correction zone.

In a pair of multifocal corneal contact lenses 22a and 22b depicted in FIG. 22, a first lens 22a comprises a circular intermediate distance correction zone 22c at the geometric center of the lens, an annular near vision correction zone 22d at the outer edge of the lens, and an annular distant vision correction zone 22e separating the circular center zone from the annular peripheral zone. The second lens 22b has a circular inner zone 22f in the form of a distant vision correction zone, an annular peripheral zone 22g in the form of a near vision correction zone, and an annular middle zone 22h in the form of an intermediate distance correction zone.

A first contact lens 23a of pair of multifocal corneal contact lenses 23a and 23b illustrated in FIG. 23 includes three concentric vision correction zones 23c, 23d and 23e. The first zone 23c, located at the center of the lens, is a near vision correction zone, while the second zone 23d, located at the edge of the lens, is an intermediate distance correction zone and the third zone 23e, located between the first two, is a distant vision correction zone. The second lens 23b of the pair includes a circular distant vision correction zone 23f at the center of the lens and two surrounding ring-shaped zones 23g and 23h. Outer ring 23g is an intermediate distance correction zone, whereas inner ring 23h is a near vision correction zone.

Preferably, the inner, circular correction zones 16c, 16f, 17c, 17f, 19c, 20c, 21c, 22f, 23c and 23f of the lenses shown in FIGS. 16 through 23 each have an area equal to approximately two-thirds of a minimum area subtended by the respective pupil of the patient. As stated above, this area distribution is believed to optimally minimize blurring during periods of high illumination. Lenses 16a, 16b, 20a, 22b, and 23b are distant vision lens during periods of high illumination, while lenses 17a, 17b, 19a, 21a, and 23a are near vision lenses in high illumination situations.

In at least some of those lenses, visual acuity of either distant vision or near vision, whichever kind of vision is not aided by the central correction zone, is optimized in periods of low illumination by controlling the relative size of the annular outer correction zones. For example, distance vision during low illumination is maximized in lenses 17b, 18a, 20b, 21a and 21b by ensuring that the portion of each of the outer zones 17g, 18d, 20g, 21d and 21g coextensive with the pupil of the respective eye during periods of low illumination covers at least approximately two-thirds of the respective pupil.

FIG. 24 illustrates a pair of multifocal corneal contact lenses 24a and 24b, wherein the first lens 24a includes an upper D-shaped intermediate distance correction zone 24c separated from a lower, D-shaped near vision correction zone 24d by a strip-shaped distant vision correction zone 24e. The other lens 24b includes an upper, D-shaped near vision correction zone 24f disposed on a side of a strip-shaped, centrally located distant vision correction zone 24h opposite a lower, D-shaped intermediate distance correction zone 24g.

As shown in FIG. 25, a pair of multifocal corneal contact lenses 25a and 25b includes a first contact lens 25a with a pair of D-shaped correction zones 25c and 25d at the top and bottom of the lens, separated by a strip-shaped auxiliary correction zone 17e. D-shaped zones 25c and 25d are a distant vision correction zone and an intermediate distance correction zone, respectively, while middle zone 25e constitutes a near vision correction zone. The second contact lens 25b of the pair shown in FIG. 25 comprises a strip-shaped near vision correction zone 25h sandwiched between an upper, D-shaped intermediate distance correction zone 25f and a lower, D-shaped distant vision correction zone 25g.

Figure 26:
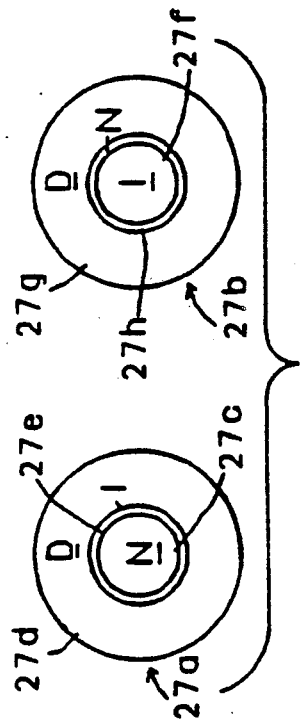

In a pair of multifocal corneal contact lenses 26a and 26b depicted in FIG. 26, a first lens 26a comprises an upper, D-shaped distant vision correction zone 26c separated by a strip-shaped intermediate distance correction zone 26e from a lower, D-shaped near vision correction zone 26d. A second lens 26b includes an upper, D-shaped distant vision correction zone 26f and a lower, D-shaped intermediate distance correction zone 26g disposed on opposite sides of a central, strip-shaped near vision correction zone 26h.

Figure 27:
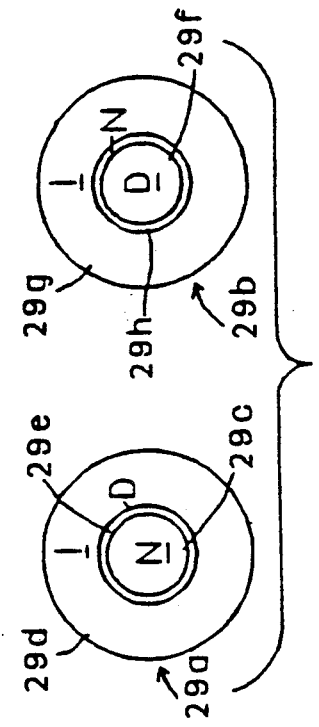

A first contact lens 27a of pair of multifocal corneal contact lenses 27a and 27b illustrated in FIG. 27 includes three vertically superimposed zones: (a) an upper, intermediate distance correction zone 27c, (b) a middle, distant vision correction zone 27e and (c) a lower, near vision correction zone 27d. The other lens 27b of the pair shown in FIG. 27 comprises a first D-shaped correction zone 27f, a second D-shaped correction zone 27g and a substantially strip-shaped correction zone 27h separating the two D-shaped zones 27f and 27g. Zones 27f, 27g and 27h are an intermediate distance correction zone, a distant vision correction zone and a near vision correction zone, respectively.

Figure 28:
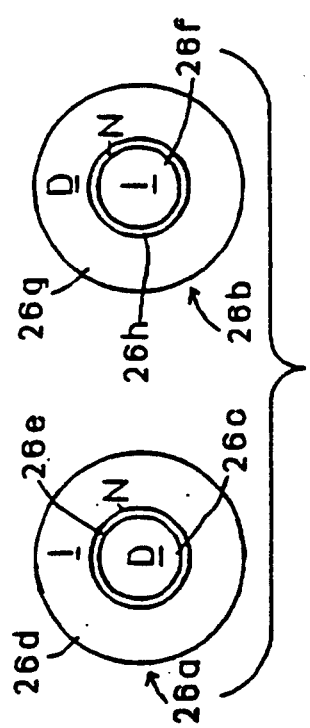

FIG. 28 illustrates a pair of multifocal corneal contact lenses 28a and 28b, wherein the first lens 28a includes an upper D-shaped near vision correction zone 28c separated from a lower, D-shaped distant vision correction zone 28d by a strip-shaped intermediate distance correction zone 28e. The other lens 28b includes an upper, D-shaped near vision correction zone 28f disposed on a side of a strip-shaped, centrally located distant vision correction zone 28h opposite a lower, D-shaped intermediate distance correction zone 28g.

Figure 29:
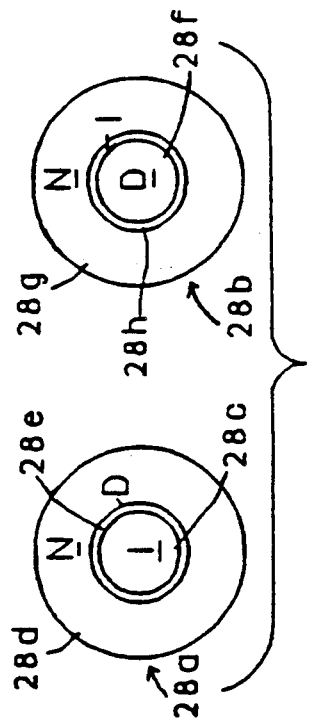

As shown in FIG. 29, a pair of multifocal corneal contact lenses 29a and 29b includes a first contact lens 29a with a pair of D-shaped correction zones 29c and 29d at the top and bottom of the lens, separated by a strip-shaped auxiliary correction zone 18e. D-shaped zones 29c and 29d are a distant vision correction zone and a near vision correction zone, respectively, while middle zone 29e constitutes an intermediate distance correction zone. The second contact lens 29b of the pair shown in FIG. 29 comprises a strip-shaped distant vision correction zone 29h sandwiched between an upper, D-shaped intermediate distance correction zone 29f and a lower, D-shaped near vision correction zone 29g.

In a pair of multifocal corneal contact lenses 30a and 30b depicted in FIG. 30, a first lens 30a comprises an upper, D-shaped near vision correction zone 30c separated by a strip-shaped intermediate distance correction zone 30e from a lower, D-shaped distant vision correction zone 30d. A second lens 30b includes an upper, D-shaped intermediate distance correction zone 30f and a lower, D-shaped distant vision correction zone 30g disposed on opposite sides of a central, strip-shaped near vision correction zone 30h.

A first contact lens 31a of pair of multifocal corneal contact lenses 31a and 31b illustrated in FIG. 31 includes three vertically superimposed zones: (a) an upper, distant vision correction zone 31c, (b) a middle, near vision correction zone 31e and (c) a lower, intermediate distance correction zone 31d. The other lens 31b of the pair shown in FIG. 31 comprises a first D-shaped correction zone 31f, a second D-shaped correction zone 31g and a substantially strip-shaped correction zone 31h separating the two D-shaped zones 31f and 31g. Zones 31f, 31g and 31h are a near vision correction zone, an intermediate distance correction zone, and a distant vision correction zone, respectively.

As shown in FIG. 32, a first lens 32a of a pair of multifocal corneal contact lenses 32a and 32b includes an upper, substantially D-shaped correction zone 32c and a lower, substantially D-shaped correction zone 32d together surrounding a circular centrally disposed correction zone 32e. Zones 32c, 32d and 32e are an intermediate distance correction zone, a near vision correction zone and a distant vision correction zone, respectively. The second lens 32b of the pair shown in FIG. 32 includes an upper, D-shaped intermediate distance correction zone 32f and a lower, D-shaped distant vision correction zone 32g disposed on opposite sides of a strip-shaped near vision correction zone 32h.

A first lens 33a of a pair of multifocal corneal contact lenses 33a and 33b illustrated in FIG. 33 includes an upper, substantially D-shaped correction zone 33c and a lower, substantially D-shaped correction zone 33d together surrounding a circular centrally disposed correction zone 33e. Zones 33c, 33d and 33e are a distant vision correction zone, a near vision correction zone and an intermediate distance correction zone, respectively. The second lens 33b of the pair shown in FIG. 33 includes an upper, D-shaped near vision correction zone 33f and a lower, D-shaped distant vision correction zone 33g disposed on opposite sides of a strip-shaped intermediate distance correction zone 33h.

As shown in FIG. 34, a first lens 34a of a pair of multifocal corneal contact lenses 34a and 34b includes an upper, substantially D-shaped correction zone 34c and a lower, substantially D-shaped correction zone 34d together surrounding a circular centrally disposed correction zone 34e. Zones 34c, 34d and 34e are an intermediate distance correction zone, a near vision correction zone and a distant vision correction zone, respectively. Second lens 34b includes three correction zones 34f, 34g and 34h arranged concentrically with respect to one another. Circular center zone 34f is a near vision correction zone, whereas outer zone 34g is a distant vision correction zone and middle zone 34h is an intermediate distance correction zone.

A first lens 35a of a pair of multifocal corneal contact lenses 35a and 35b illustrated in FIG. 35 includes an upper, substantially D-shaped correction zone 35c and a lower, substantially D-shaped correction zone 35d together surrounding a circular centrally disposed correction zone 35e. Zones 35c, 35d and 35e are a distant vision correction zone, a near vision correction zone and an intermediate distance correction zone, respectively. The second lens 35b of the pair shown in FIG. 35 includes three correction zones 35f, 35g and 35h arranged concentrically with respect to one another. Circular center zone 35f is an intermediate distance correction zone, whereas outer zone 35g is a distant vision correction zone and middle zone 35h is a near vision correction zone.

A first lens 36a of a pair of multifocal corneal contact lenses 36a and 36b illustrated in FIG. 36 includes an upper, substantially D-shaped near vision correction zone 36c and a lower, substantially D-shaped distant vision correction zone 36d together surrounding a circular centrally disposed intermediate distance correction zone 36e. The second lens 36b of the pair shown in FIG. 36 includes three correction zones 36f, 36g and 36h arranged concentrically with respect to one another. Circular center zone 36f is a near vision correction zone, whereas outer zone 36g is a distant vision correction zone and middle zone 36h is an intermediate distance correction zone.

The contact lenses of the instant invention can be made of any conventional contact lens material. Such materials are polymeric compositions including, but not limited to, soft lens and hard lens materials, gas permeable polymers, and, more particularly, ethyl methacrylates and silicone acrylates.

The contact lenses of the instant invention may be manufactured by machining. In particular, the lenses with a point symmetric or concentric configuration may be produced by cutting on a lens lathe, as described in U.S. Pat. No. 4,704,016 to de Carle. Pursuant to the disclosure of that patent, the anterior or convex side of the lens (facing away from the eye surface) is initially cut along a curve essentially matching the final surface of the distant vision correction zone or zones of the lens. The near vision correction zones are then machined by taking a series of steeper cuts. Sharp steps may be avoided by continually changing the position of the center of curvature when moving the cutting tool in a controlled manner to produce the desired profile.

Accordingly, intermediate-distant, intermediate distance, and intermediate-near vision correction zones are produceable by taking a first series of cuts for the intermediate distant zones, a second series of deeper cuts for the intermediate distance zones and a third series of even deeper cuts for the near vision zones.

Pursuant to the teachings of de Carle, the different correction zones of a contact lens in accordance with the instant invention may alternatively or additionally be implemented by embedding, in a base matrix, pieces of material having a refractive index different from that of the base material.

The contact lenses of the instant invention are manufactured preferably by a molding technique, optionally with subsequent machining and polishing, to form recesses on the posterior (cornea facing) sides of the lenses for producing the various correction zones.

As illustrated in FIG. 37, lens 1a of FIG. 1 is provided on a posterior side 37a with an annular peripheral cornea matching surface 37b, an annular concave surface 37c corresponding to annular near vision correction zone 1d, and a centrally located concave surface 37d corresponding to circular distant vision correction zone 1c. Concave surface 37d has a radius of curvature which is smaller than the radius of curvature of annular concave surface 37c which in turn is smaller than the radius or radii of curvature of the cornea matching surface(s) 37b. Concave surface 37c is preferably also a cornea matching surface, the prescription of near vision correction zone 1d being controlled in that event by the curvature of an outer, convex surface 37e of lens 1a. The radii of curvature of concave surface 37d is predetermined so that, together with a tear reservoir which will be formed between the lens and the eye surface upon application of the lens to the eye, the particular prescription of a patient is satisfied.

Alternatively, the recess formed by concave surface 37d may be filled with an appropriate gas permeable synthetic resin material. In that case, the radii of curvature of concave surface 37d is modified to achieve the same prescription.

Similarly, as depicted in FIG. 38, lens 1b is provided on a posterior side 38a with an annular peripheral cornea matching surface or surfaces 38b, an annular concave surface 38c for forming distant vision correction zone 1f, and a central circular concave surface 38d for forming near vision correction zone 1e. The radius of curvature of concave surface 38c is predetermined so that, together with a tear reservoir which will be formed between the lens surface and the eye surface upon application of the lens to the eye, the particular distant vision prescription of a patient is satisfied. Alternatively, the recess formed by concave surface 38c may be filled with an appropriate gas permeable synthetic resin material. If so, the radii of curvature of that concave surface is modified to result in the same prescription. Concave surface 38d may be a conrean matching surface and thus have a radius of curvature predetermined by the curvature of the patient's cornea at the center of the respective eye. In that case, the patient's near vision prescription for that eye is attained by controlling the curvature of anterior lens surface 38e.

FIG. 39 shows a cross-sectional configuration of lens 2a. A posterior side 39a of lens 2a includes an annular peripheral cornea matching surface 39b having a relatively large radius of curvature, an annular concave surface 39c also having a relatively large radius of curvature, an intermediate annular concave surface 39d having a relatively small radius of curvature, and a centrally located circular concave surface 39e having an even smaller radius of curvature. Surfaces 39c, 39d and 39e correspond to near vision correction zone 2d, intermediate distance correction zone 2e and distant vision correction zone 2c, respectively. As described hereinabove with reference to lenses 1a and 1b, surface 39c is preferably a cornea matching surface, while the radii of curvature of surfaces 39d and 39e are determined in part by whether the recesses formed by the surfaces are filled with a polymeric material (e.g., gas permeable silicone acrylate) or tear fluid.

As shown in FIG. 40, lens 2b is provided on a posterior side 40a with an annular peripheral cornea matching surface 40b, an annular concave surface 40c, another annular concave surface 40d and a central circular concave surface 40e. Surfaces 40c, 40d, and 40e correspond to distant vision correction zone 2g, intermediate distance correction zone 2h and near vision correction zone 2f, respectively. The radius of curvature of distant vision surface 40c is smaller than the radius of curvature of intermediate distance surface 40d which in turn is smaller than the radius of curvature of near vision surface 40e. Surface 40e may contact (via an intermediate tear layer) the cornea of the respective eye, while surfaces 40c and 40d are spaced from the cornea by a tear reservoir, formed upon application of the respective contact lens to the patient's eye, or by a polymeric, preferably gas permeable material. The precise curvatures of the concave surfaces 40c and 40d will vary in accordance with whether the intervening polymeric layer is included.

Figure 41:
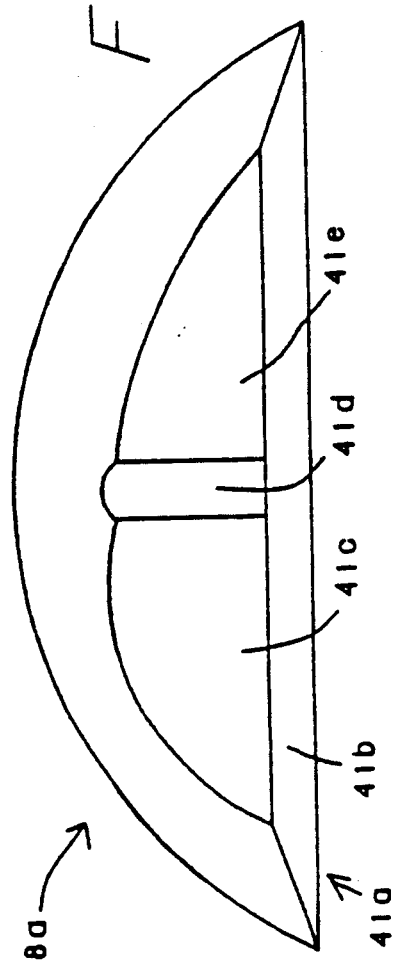
FIG. 41 is a cross-sectional view taken along line F—F in FIG. 8.

As depicted in FIG. 41, contact lens 8a may be provided on a posterior side 41a with an annular peripheral cornea matching surface 41b, an upper concave surface 41c, a middle concave surface 41d and a lower concave surface 41e. Surfaces 41c, 41d and 41e respectively correspond to distant vision correction zone 8c, intermediate distance correction zone 8e and near vision correction zone 8d. Distant vision surface 41c has a radius of curvature smaller than the radius of curvature of intermediate distance surface 41d which is in turn smaller than the radius of curvature of lens surface 41e.

Figure 42:
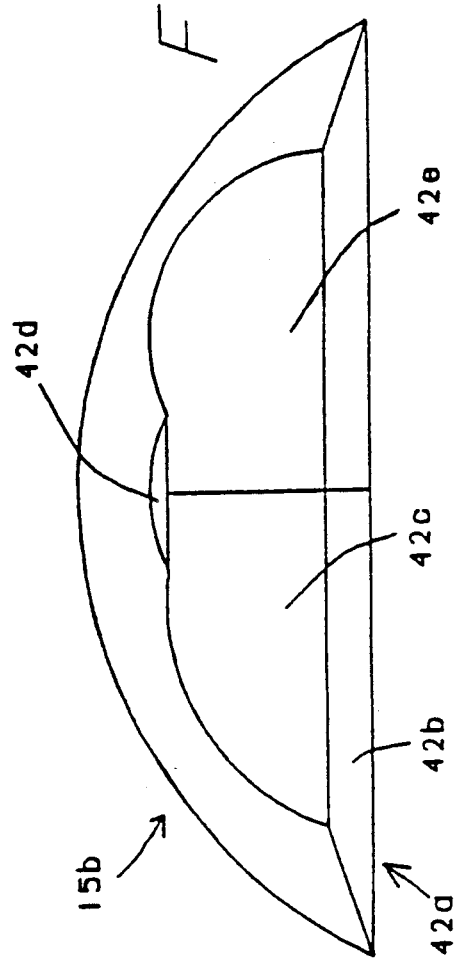
FIG. 42 is a cross-sectional view taken along line G—G in FIG. 15.

FIG. 42 illustrates a cross-sectional view of lens 15b. On a posterior side 42a, lens 15b is formed with an annular cornea matching surface 42b, an upper concave surface 42c, a centrally located circular concave surface 42d and a lower concave surface 42e. Surfaces 42c, 42d and 42e form intermediate distance correction zone 15f, near vision correction zone 15h and distant vision correction zone 15g, respectively. Upper and lower surfaces 42c and 42e extend horizontally across the lens and have radii of curvature smaller than the radius of curvature of surface 42d. The radius of curvature of surface 42e is smaller than the radius of curvature of surface 42c.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are preferred by way of example to facilitate comprehension of the invention and should not be construed to limit the scope thereof.

What is claimed is:

1. A pair of multifocal corneal contact lenses, comprising:
   a first contact lens for one eye of a patient, said lens having a first distant vision correction zone and a first near vision correction zone; and
   a second contact lens for the other eye of the patient, said second contact lens having a first correction zone and a second correction zone, said first correction zone corresponding at least generally in shape and location to said distant vision correction zone of said first contact lens, said second correction zone corresponding at least generally in shape and location to said near vision correction zone of said first contact lens, said first correction zone constituting a second near vision correction zone and said second correction zone constituting a second distant vision correction zone, at least one of said first contact lens and said second contact lens having an intermediate distance correction zone separating the distant vision correction zone from the respective near vision correction zone of said one of said first contact lens and said second contact lens.

2. The pair of contact lenses defined in claim 1 wherein said first distant vision correction zone occupies a circular area and said first near vision correction zone occupies a annular area disposed about said first distant vision correction zone, said second near vision correction zone occupying a circular area and said second distant vision correction zone occupying an annular area disposed about said second near vision correction zone.

3. The pair of contact lenses defined in claim 2 wherein said first distant vision correction zone and said second near vision correction zone each has an area equal to approximately two-thirds of a minimum area subtended by the respective pupil of the patient.

4. The pair of contact lenses defined in claim 3 wherein a portion of said second distant vision correction zone coextensive with the pupil of the respective eye in a maximally opened state thereof occupies an area equal to at least two thirds of the area of the respective pupil in its maximally opened state, a portion of said first near vision correction zone coextensive with the pupil of the respective eye in a maximally opened state thereof occupying an area equal to at least two thirds of the area of the respective pupil in its maximally opened state.

5. The pair of contact lenses defined in claim 3 wherein said intermediate distance correction zone constitutes a first annular intermediate distance correction zone between said first distant vision correction zone and said first near vision correction zone, further comprising, in said second contact lens, a second annular intermediate distance correction zone between said second near vision correction zone and said second distant vision correction zone.

6. The pair of contact lenses defined in claim 1 wherein said first distant vision correction zone, said first near vision correction zone, said second distant vision correction zone, and said second near vision correction zone are all substantially D-shaped in plan view of said first contact lens and said second contact lens.

7. The pair of contact lenses defined in claim 6 wherein said intermediate distance correction zone constitutes a first intermediate distance correction zone between said first distant vision correction zone and said first near vision correction zone, further comprising, in said second contact lens, a second intermediate distance correction zone between said second near vision correction zone and said second distant vision correction zone.

8. The pair of contact lenses defined in claim 7 wherein said first intermediate distance correction zone and said second intermediate distance correction zone are substantially strip shaped.

9. A pair of multifocal corneal contact lenses, comprising:
   a first contact lens for one eye of a patient, said lens having a distant vision correction zone, a near vision correction zone and an intermediate distance correction zone; and
   a second contact lens for the other eye of the patient, said second contact lens having a first correction zone, a second correction zone and a third correction zone, said first correction zone corresponding generally in shape and location to said distant vision correction zone of said first contact lens, said second correction zone corresponding generally in shape and location to said near vision correction zone of said first contact lens, said third correction zone corresponding generally in shape and location to said intermediate distance correction zone of said first contact lens, one of said first correction zone, said second correction zone and said third correction zone having a focal length lying in the same focal range as the focal length of the corresponding zone of said first contact lens, the other two of said first correction zone, said second correction zone and said third correction zone each having a focal length lying in the same focal range as the one of the remaining two zones of said first contact lens having a size and location therein different from the size and location of the respective correction zone in said second contact lens, whereby said other two of said first correction zone, said second correction zone and said third correction zone are switched in location with respect to said first contact lens.

10. The pair of contact lenses defined in claim 9 wherein said one of said first correction zone, said second correction zone and said third correction zone is a distant vision correction zone.

11. The pair of contact lenses defined in claim 9 wherein said one of said first correction zone, said second correction zone and said third correction zone is a near vision correction zone.

12. The pair of contact lenses defined in claim 9 wherein said one of said first correction zone, said second correction zone and said third correction zone is an intermediate distance correction zone.

13. The pair of contact lenses defined in claim 9 wherein said first correction zone, said second correction zone and said third correction zone have relative sizes different from relative sizes of said distant vision correction zone, said near vision correction zone and said intermediate distance correction zone.

14. The pair of contact lenses defined in claim 9 wherein said distant vision correction zone, said near vision correction zone and said intermediate distance correction zone are all concentric with respect to each other, said first correction zone, said second correction zone and said third correction zone all being concentric with respect to each other.

15. The pair of contact lenses defined in claim 14 wherein said one of said first correction zone, said second correction zone and said third correction zone is a circular central zone.

16. The pair of contact lenses defined in claim 14 wherein said one of said first correction zone, said second correction zone and said third correction zone is an annular middle zone.

17. The pair of contact lenses defined in claim 14 wherein said one of said first correction zone, said second correction zone and said third correction zone is an annular outer zone.

18. The pair of contact lenses defined in claim 14 wherein said distant vision correction zone is a central circular region and said one of said first correction zone, said second correction zone and said third correction zone is said first correction zone.

19. The pair of contact lenses defined in claim 9 wherein two of said distant vision correction zone, said near vision correction zone and said intermediate distance correction zone and two of said first correction zone, said second correction zone and said third correction zone are essentially D-shaped in plan view of said first contact lens and said second contact lens.

20. The pair of contact lenses defined in claim 19 wherein the other of said distant vision correction zone, said near vision correction zone and said intermediate distance correction zone and the other of said first correction zone, said second correction zone and said third correction zone are essentially strip shaped.

21. A pair of multifocal corneal contact lenses, comprising:
a first contact lens for one eye of a patient, said lens having a first correction zone and a second correction zone concentrically disposed with respect to one another, said first correction zone being circular and said second correction zone being annular in plan view of said first contact lens, said first correction zone constituting a distant vision correction zone and said second correction zone constituting a near vision correction zone; and
a second contact lens for the other eye of the patient, said second contact lens having a third correction zone and a fourth correction zone concentrically disposed with respect to one another, said third correction zone being circular and said fourth correction zone being annular in plan view of said second contact lens, said third correction zone constituting a near vision correction zone and said fourth correction zone constituting a distant vision correction zone,
wherein said first correction zone and said third correction zone each have an area equal to at least approximately two-thirds of a minimum area subtended by the respective pupil of the patient.

22. The pair of contact lenses defined in claim 21 wherein a portion of said second correction zone and a portion of said fourth correction zone coextensive with the pupil of the respective eye in a maximally opened state of such pupil each cover an area equal approximately to at least two-thirds of the area subtended by the respective pupil in said maximally opened state.

23. The pair of contact lenses defined in claim 22 wherein said second correction zone is immediately adjacent said first correction zone and said fourth correction zone is immediately adjacent said third correction zone.

24. The pair of contact lenses defined in claim 22 wherein said first contact lens has a first annular intermediate distance correction zone between said first correction zone and said second correction zone, said second contact lens having a second annular intermediate distance correction zone disposed between said third correction zone and said fourth correction zone.

25. A pair of multifocal corneal contact lenses, comprising:
a first contact lens for one eye of a patient, said lens having a circular first correction zone, an annular second correction zone disposed concentrically around said first correction zone and an annular third correction zone concentrically disposed around said second correction zone, one of said first correction zone, said second correction zone and said third correction zone constituting a distant vision correction zone, another of said first correction zone, said second correction zone and said third correction zone constituting a near vision correction zone, and yet another of said first correction zone, said second correction zone and said third correction zone constituting an intermediate distance correction zone; and
a second contact lens for the other eye of the patient, said second contact lens having a fourth correction zone and a fifth correction zone, one of said fourth correction zone and said fifth correction zone constituting a distant vision correction zone and the other of said fourth correction zone and said fifth correction zone constituting a near vision correction zone, at least one of said fourth correction zone and said fifth correction zone having a D-shape in plan view of said second contact lens.

26. A multifocal corneal contact lens comprising a circular first correction zone, a second correction zone disposed on one side of said first correction zone and a third correction zone disposed on a side of said first correction zone opposite said second zone, said second correction zone and said third correction zone being separated at a substantial center of the contact lens by said first correction zone and being adjacent one another along a substantially diametrically extending line on opposite sides of said first correction zone, one of the three zones being a distant vision correction zone, another of the three zones being a near vision correction zone and a remaining one of the three zones being an intermediate distant correction zone.

27. A pair of multifocal corneal contact lenses, comprising:
a first contact lens for one eye of a patient, said lens having a first correction zone and second correction zone, said first correction zone having a focal length in a first focal range and said second correction zone having a focal length in a second focal range; and
a second contact lens for the other eye of the patient, said second contact lens having a third correction zone and a fourth correction zone, said third correction zone corresponding generally in size shape and location to said first correction zone, said fourth correction zone corresponding generally in shape and location to said second correction zone, said third correction zone having a focal length in said second focal range and said fourth correction zone having a focal length in said first focal range, at least one of said first contact lens and said second contact lens having on an anterior side a continuous surface with essentially a single radius of curvature, said one of said first contact lens and said second contact lens being provided on a posterior side with a cornea matching surface extending annularly along a periphery of said lens, said posterior side being further formed with at least one concave surface having a radius of curvature smaller than any radius of curvature of said cornea matching surface, said concave surface being radially spaced from a geometric center of said lens.

28. A pair of multifocal corneal contact lenses, comprising:

a first contact lens for one eye of a patient, said lens having a first correction zone and second correction zone, said first correction zone having a focal length in a first focal range and said second correction zone having a focal length in a second focal range; and a second contact lens for the other eye of the patient, said second contact lens having a third correction zone and a fourth correction zone, said third correction zone and said fourth correction zone each having a geometric configuration different from said first correction zone and said second correction zone, said third correction zone having a focal length in a third focal range and said fourth correction zone having a focal length in a fourth focal range different from said third focal range, at least one of said first contact lens and said second contact lens having on an anterior side a continuous surface with essentially a single radius of curvature, said one of said first contact lens and said second contact lens being provided on a posterior side with a cornea matching surface extending annularly along a periphery of said lens, said posterior side being further formed with at least one concave surface having a radius of curvature smaller than any radius of curvature of said cornea matching surface, said concave surface being spaced from a geometric center of said lens.

* * * * *